Figure 1:
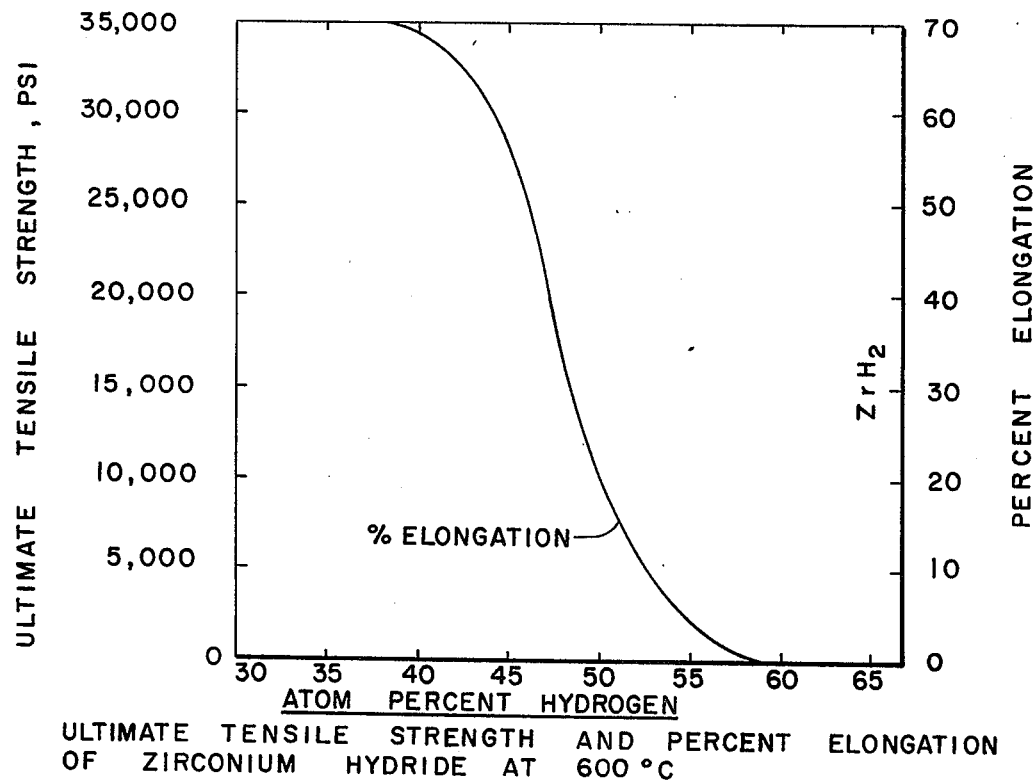

United States Patent [19]

Vetrano

[11] 3,943,210

[45] Mar. 9, 1976

[54] PREPARATION OF METAL HYDRIDE BODIES BY IMPROVED POWDER METALLURGY PROCESS

[75] Inventor: James B. Vetrano, Woodland Hills, Calif.

[73] Assignee: Rockwell International Corporation, El Segundo, Calif.

[22] Filed: Apr. 9, 1964

[21] Appl. No.: 360,166

[52] U.S. Cl............... 264/.5; 252/301.1 R; 176/89; 176/92 R
[51] Int. Cl............................................ G21c 21/00
[58] Field of Search ................. 176/68, 69, 89, 92; 23/204; 264/.5, 3; 252/301.1

[56] References Cited
UNITED STATES PATENTS 3,019,176 1/1962 Wetherbee............................. 75/226
3,164,525 1/1965 Wetch et al. .......................... 176/69

Primary Examiner—Benjamin R. Padgett
Assistant Examiner—B. Hunt
Attorney, Agent, or Firm—L. Lee Humphries; Henry Kolin

[57] ABSTRACT

A method of fabricating a group IVB metal hydride body having a hydrogen content of at least 55 atom percent and a high density, which comprises mixing together powders of said metal hydride having less than about 55 atom percent hydrogen with powders of said metal hydride having at least about 60 atom percent hydrogen, and then hot forming the resulting mixture to cause flow of ductile powders and thereby give a high density compact.

8 Claims, 2 Drawing Figures

ULTIMATE TENSILE STRENGTH AND PERCENT ELONGATION OF ZIRCONIUM HYDRIDE AT 600 °C

TEMPERATURE — DEPENDENCE OF ULTIMATE TENSILE STRENGTH AND PERCENT ELONGATION FOR ALLOYS CONTAINING 47—50 a/o H

INVENTOR.
JAMES B. VETRANO
BY
Gerald A. Koris

PREPARATION OF METAL HYDRIDE BODIES BY IMPROVED POWDER METALLURGY PROCESS

The present invention relates to an improved process for preparing metal hydride bodies by powder metallurgy, and more particularly to a powder metallurgy process for producing dense metal hydride bodies having a high hydrogen concentration.

Metal hydride compositions such as zirconium and titanium hydrides (group IVB of the periodic table of the elements, "Handbook of Chemistry and Physics", pages 448–449, 44th edition) are employed as moderating materials in nuclear reactors. Hydrogen has the greatest neutron slowing down power of any element, and combined with the group IVB metals, which have reasonable structural properties, it is in a relatively stable, high density form. Homogeneous metal hydride nuclear fuel compositions are of particular interest where small reactor cores of high power density are required, for example, for remote terrestrial bases, mobile applications, and as auxiliary power sources in space vehicles. Reactor systems for such applications have been developed, and for information concerning their characteristics reference is made to Nucleonics, vol. 18, No. 1, January 1960.

Hydrogen does not combine with group IVB metals in a fixed stoichiometry; the hydrogen is interstitially absorbed in the metal matrix in variable amounts. The moderating properties of the composition are dependent upon the hydrogen concentration, and it follows that the reactor core size is directly proportional to the hydrogen concentration. Since size and weight are at a premium, particularly in space power plants, it is necessary to increase power density to reduce the size of a reactor core. This has stimulated the development of methods of increasing the hydrogen concentration of metal hydride fuel compositions. Two general methods have been available for the preparation of homogeneous metal hydride fuel elements: massive hydriding and powder metallurgy. In massive hydriding, uranium-zirconium alloy bodies fabricated to approximately the final shape are heated in a hydrogen atmosphere to absorb the desired concentration of hydrogen. Since zirconium expands greatly upon hydriding and the hydrogen distribution must be substantially uniform throughout a fuel rod, massive hydriding requires very long time periods under carefully controlled temperature and conditions to avoid cracking and to assure uniform hydrogen distribution. Such processes are necessarily costly, and there are additional costs resulting from machining losses of the finished product. In principal, powder metallurgy processes offer economies in the preparation of zirconium hydride bodies. Zirconium powders can be hydrided to the desired hydrogen concentration, cold formed, and hot pressed in a short period of time. Process yields can be considerably higher because machining losses are not as great and, further, any losses can be readily recycled. Moreover, it is relatively easy to add nuclear fuels and/or burnable poisons to the product. In spite of such potential economies of powder metallurgical processing, there are certain drawbacks which have resulted in the adoption of massive hydriding methods. It has been considered that the brittle nature and reversible decomposition of zirconium hydride does not make it amenable to normal powder densification processes of sintering or hot pressing and, further, the approximately 90–95 percent densities obtainable had poor mechanical and heat transfer properties. Massively hydrided material, in contrast, has had greater density, higher thermal conductivity, and generally better mechanical properties.

An object of the present invention, therefore, is to provide an improved powder metallurgy method of preparing group IVB metal hydride bodies.

Another object is to provide an improved powder metallurgy method of preparing uranium-zirconium hydride fuel bodies of high densities.

Another object is to provide a powder metallurgy method of preparing dense uranium-zirconium hydride fuel bodies having high hydrogen concentrations.

Still another object is to provide such a method which achieves densities approaching 100 percent of theoretical, and a hydrogen-to-zirconium atom ratio of at least 1.2.

Still another object is to provide a relatively simple and economical method of obtaining such powder metallurgical bodies which requires neither excessive temperature nor excessive pressure.

The above and other objects and advantages of the present invention will become apparent from the following detailed description.

Figure 2:
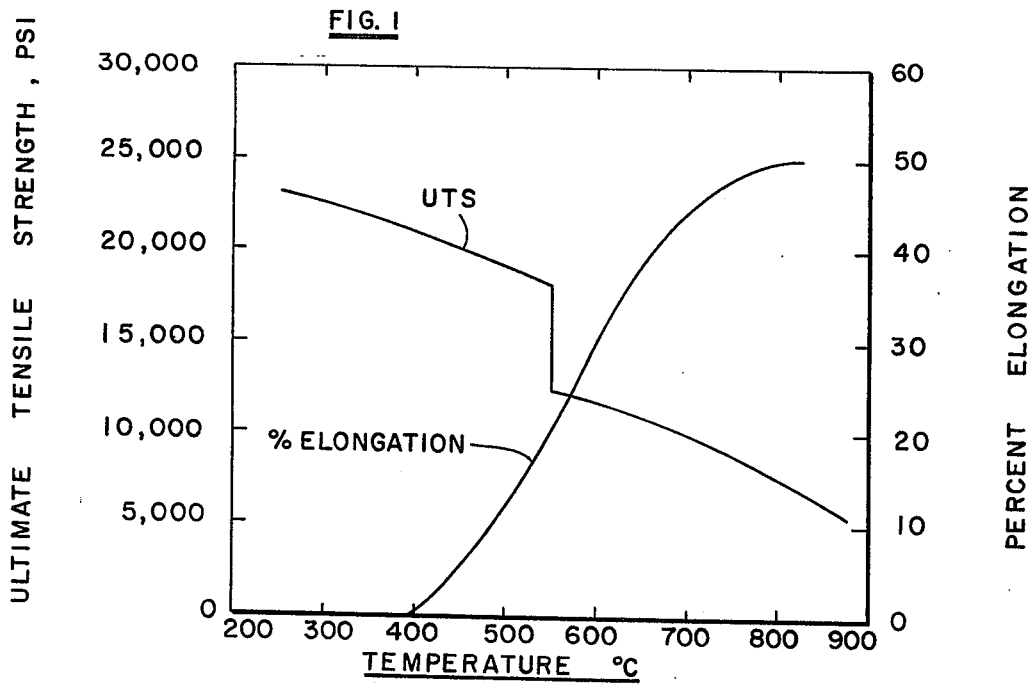

In the drawings, FIGS. 1 and 2 are graphs illustrating certain metallurgical properties of group IVB metal hydrides which are utilized in the present invention.

In accordance with the present invention, high density group IVB metal hydride bodies are obtained by blending such metal hydride powders containing less than about 55 atom percent hydrogen with powders of greater than about 60 atom percent hydrogen, and then hot forming the powder mixture. In this manner, powders of ductile properties (those with the lesser hydrgen concentration in the alpha + delta phase) are blended with powders of brittle properties (higher hydrogen concentration in the delta and epsilon phases). In the hot forming step the ductile powders will flow and yield a high density compact. Subsequent or concurrent heating of the compact takes advantage of the reversibility of the hydriding reaction. The mixture is homogenized, resulting in disappearance of the original ductile and brittle phases and their replacement by a single phase of an intermediate hydrogen content. The resulting body is highly dense, homogeneous, and of the same general properties and characteristics as one obtained through the more costly and time consuming massive hydriding.

For example, a zirconium hydride body having the formulation $ZrH_{1.8}$ can be obtained by mixing powders of $ZrH_{2.0}$ and $ZrH_{1.0}$, and warm swaging at a temperature sufficient to cause flow of the $ZrH_{1.0}$ phase, resulting in a nearly 100 percent dense matrix. In the course of the warm swaging (depending upon temperature), later processing, or actual service, the hydrogen homogenizes in the structure according to the following balanced reaction,

$$0.8 ZrH_{2.0} + 0.2 ZrH_{1.0} \rightarrow ZrH_{1.8},$$

and the end product is the same as that achieved in massive hydriding. Similarly, if a final product $ZrH_{1.6}$ were desired 40 percent $ZrH_{1.0}$ would be blended with 60 percent $ZrH_{2.0}$, or other balancing adjustments made in the hydrogen concentration of the powders or amounts used in the mixture.

The basis of the present invention is the utilization of a mixture of group IVB metal hydride powders of different hydrogen concentrations, in different phases, and with different physical properties. In order for powder metallurgical processing of such hydrides to be effective, one of two conditions must prevail: (1) the material must have sufficient ductility to allow it to flow in some type of forming operation, or (2) it must have enough thermal stability to be sintered at an elevated temperature. Group IBV hydrides containing high hydrogen concentration in the delta or epsilon phases (greater than about 60 atom percent hydrogen) have neither sufficient ductility nor sufficient thermal stability to make them amenable to powder compaction or sintering to high density, whereas the hydrides in the alpha + delta phase, below about 55 percent hydrogen, are ductile and will flow. The alpha + delta continues to 60 percent hydrogen, but between 55 percent and 60 percent hydrogen the material is insufficiently ductile for present purposes.

This feature is readily seen by reference to FIG. 1. Considering the elongation (ductility) of zirconium hydride as a function of hydrogen concentration at 600° C., above about 60 atom percent hydrogen ($ZrH_{1.5}$) the material exhibits no flow. Below about 55 atom percent hydrogen ($ZrH_{1.2}$) and particularly below about 50 atom percent, the ductility increases significantly as the hydrogen content is lowered. The ductility of zirconium hydride is temperature dependent as well as hydrogen content dependent, as is seen in FIG. 2. With about 50 atom percent hydrogen the relatively good ductility at 600° C. disappears below 400° C. Further, there is practically no ductility with delta or epsilon phase zirconium hydride at any temperature where the decomposition pressure of the material is sufficiently low.

Another factor to be considered in any hot forming operation is the dissociation pressure of metal hydrides which are reversibly decomposed at elevated temperatures. Equilibrium decomposition pressure is related to both the temperature and the composition of the condensed phase. Above 1260° C. (the minimum temperature for sintering zirconium metal) the dissociation pressure of delta or epsilon hydride of any give hydrogen content is well in excess of 10 atmospheres. By mixing high hydrogen content material in the delta or epsilon phases, having low ductility and lack of thermal stability at high temperature, with powders in the alpha + delta phase containing less than about 55 atom percent hydrogen and displaying satisfactory ductility, a high density compact of high hydrogen content can be obtained in warm forming. Then, by utilizing the reversibility of the hydriding reaction, a single homogeneous phase of an intermediate hydrogen content is obtained.

Two of the principal parameters in the performance of the present invention are the ratio of original ductile to brittle phases, and the temperature of the forming operation. The ductile phase, containing less than about 55 atom percent hydrogen, must be present in sufficient volume to go around the brittle phase and fill in all the interstices in order to achieve high final densities. At least about 10 percent of the ductile phase is required, while about 25 percent is preferred. The addition of nuclear fuel to the powder mixture does not increase the required concentration of the alpha + delta phase, since uranium metal is also ductile and will flow at forming temperatures. If the volumetric concentration of uranium is high, e.g., greater than about 10 volume percent, the concentration of the ductile phase may be reduced.

The forming temperature utilized must account for several factors. It must be high enough so that the ductile phase flows readily. However, if too high a temperature is used, homogenization of the mix may occur prematurely, eliminating the necessary ductile phase before forming is completed. Further, very high temperatures also lead to high hydrogen dissociation pressures in the material, which create containment problems. A temperature in the region of about 500–650° C. is generally satisfactory, while a temperature of about 600° C. is preferred.

The present invention is practiced in the following manner. Calculated amounts of $Zr-ZrH_{1.2}$ composition powder are blended with $ZrH_{1.5}-ZrH_{2.0}$ powder by any conventional solid mixing process. Any required nuclear fuel, such as uranium, thorium, or plutonium, or burnable poison is added at this time. As used herein and in the appended claims, reference to the metal hydrides includes both the metal and alloys thereof, such as zirconium-uranium and mixtures of zirconium hydride and uranium, as well as mixtures containing small amounts of nuclear poisons. The blended powders are cold compacted such as by pressing or swaging, and then hot formed. The hot forming operation can be any known method such as rolling or swaging. (Cold compacting is not required prior to hot swaging.) The compact is contained in a sealed envelope during the hot forming operation to prevent oxidation and/or loss of hydrogen. After hot forming, the protective envelope may be retained as a cladding material, or it can be stripped off and the product reclad with a different material. A post hot-forming homogenization step may then be performed, if desired, at some temperature greater than about 650° C., for example at 700° C., but such may not be necessary. Homogenization is not necessary for a low temperature application since the dissociation pressure of the higher hydrogen content material is not excessive, and similarly for higher temperature applications homogenization may take place in situ during use.

The following specific examples are offered to illustrate the present invention in greater detail.

EXAMPLE I

Fifty grams of $ZrH_{0.8}$ and 150 grams of $ZrH_{1.9}$ powders were blended by passing several times through a 16-mesh screen and hand stirring after each pass. A 42.10-gram sample of the blended powders was cold compacted at 41.7 tsi to give a 0.205-inch by 0.890-inch × 3.015-inch green compact. Stearic acid in acetone was used on the die walls to reduce friction, but no binder was added to the powder. The green compact was placed in a type 304 stainless steel hollow picture frame and 0.084-inch thick cover plates welded on top and bottom. The picture frame and cover plates had been pre-oxidized to prevent bonding to the zirconium hydride. The assembled picture frame assembly and green compact were evacuated to vacuum through a side stem which was then pinched off. The pack was pre-heated for 30 minutes at 1100° F. and rolled to about a 10 percent reduction in thickness. Two more passes with the same reduction were taken using a re-heat cycle of 10 minutes between passes. After cooling to room temperature, the cladding was stripped with an end mill, and small samples of the core taken for density determinations and hydrogen analyses. The density, determined by displacement in ethyl alcohol was found to be 5.57 gm./cm.³. The hydrogen content as determined by weight loss in a vacuum at elevated temperature was 1.76 weight percent, which corresponds to a composition of $ZrH_{1.62}$. Since the X-ray density of $ZrH_{1.62}$ is 5.645 gm./cm.³, the compact had a density of 98.8 percent of theoretical.

EXAMPLE II

The procedure of Example I is followed. Ten grams of uranium metal powder are blended with 20 grams of $ZrH_{0.8}$ powder and 70 grams of $ZrH_{1.9}$ powder and cold compacted. The blending and die loading operations are carried out in an inert gas atmosphere to avoid oxidation of the finely divided uranium powder. After rolling at 1100° F. a 90 percent dense compact consisting of 10 weight percent uranium and 90 weight percent $ZrH_{1.65}$ is obtained.

The above examples are illustrative rather than restrictive of the invention. Within the scope of the invention procedural and compositional variations may be made. The present invention should be understood to be limited, therefore, only as is indicated by the appended claims.

What is claimed is:

1. A method of fabricating a group IVB metal hydride body having a hydrogen content of at least 55 atom percent and a high density, which comprises mixing together powders of said metal hydride having less than about 55 atom percent hydrogen with powders of said metal hydride having at least about 60 atom percent hydrogen, and then hot forming the resulting mixture to cause flow of ductile powders and thereby give a high density compact.

2. A method of forming a high density zirconium hydride body containing at least about 55 atom percent hydrogen, which comprises forming a powder mixture of zirconium hydride powders, said mixture containing about 10-25 percent of powders having less than about 55 atom percent hydrogen and the remainder zirconium hydride powders containing at least about 60 atom percent hydrogen, and then hot forming the cold compacted body at a temperature of about 500°-650° C. in a non-oxidizing atmosphere.

3. The method of claim 3 wherein nuclear fuel is blended with the zirconium hydride powder mixture prior to cold forming.

4. A method of forming a zirconium hydride body containing at least about 55 atom percent hydrogen of high density and uniform hydrogen content, which comprises blending zirconium hydride powders having less than about 55 atom percent hydrogen with zirconium hydride powders having at least 60 atom percent hydrogen, cold compacting the resulting powder mixture, hot forming the cold formed body at a temperature of about 500°-650° C. in a non-oxidizing atmosphere to form a dense zirconium hydride body, and heating the resulting formed body at a temperature greater than about 650° F., thereby forming a composition having a homogenous hydrogen concentration intermediate between the hydrogen concentration of said initial zirconium hydride powders.

5. The method of claim 4 wherein the homogenization is conducted at a temperature of about 700° C.

6. A method of forming a zirconium hydride body having the formula $ZrH_{1.8}$ which comprises mixing 80 percent $ZrH_{2.0}$ powder with 20 percent $ZrH_{1.0}$ powder, cold compacting the resulting powder mixture, and hot rolling the resulting powder compact at a temperature of about 600° C., thereby achieving a body having a density of at least 98 percent of theoretical, and then heating said body at a temperature of about 700° C., to achieve uniform hydrogen distribution and the formula $ZrH_{1.8}$.

7. The method of forming a high density zirconium hydride body of high hydrogen concentration, which comprises forming a mixture of about 10–25 weight percent $Zr-ZrH_{1.2}$ powders and the remainder $ZrH_{1.5}$-$ZrH_{2.0}$ powders, and hot forming the resulting powder mixture at a temperature of about 500°–650° C. in a non-oxidizing atmosphere to cause flow of the ductile powders and thereby give a high density compact.

8. A method of forming a high denstiy zirconium hydride body of high hydrogen concentration which comprises forming a mixture of about 10–25 weight percent zirconium hydride powders in the ductile alpha×delta phase and the remainder zirconium hydride powders in the brittle delta×epsilon phase, and hot forming the resulting mixture at a temperature of about 500°–650° C. in a non-oxidizing atmosphere to cause flow of the ductile powders and yield a high density compact.

* * * * *

UNITED STATES PATENT AND TRADEMARK OFFICE
CERTIFICATE OF CORRECTION

PATENT NO. : 3,943,210
DATED : March 9, 1976
INVENTOR(S) : James B. Vetrano

It is certified that error appears in the above-identified patent and that said Letters Patent are hereby corrected as shown below:

Column 3, line 13, after "whereas" delete --the--; line 15, after "delta" insert --phase--.
Column 5, line 16, "90" should read --99--.
Column 6, line 29, "The" should read --A--; lines 41 and 42 "x" should read --+-- (both occurrences).

Signed and Sealed this

Twenty-third Day of November 1976

[SEAL]

Attest:

RUTH C. MASON
*Attesting Officer*

C. MARSHALL DANN
*Commissioner of Patents and Trademarks*